United States Patent
Lee et al.

(10) Patent No.: US 10,924,752 B2
(45) Date of Patent: *Feb. 16, 2021

(54) METHOD AND APPARATUS FOR PREDICTING INTER-LAYER BASED ON TEMPORAL SUB-LAYER INFORMATION

(71) Applicant: Electronics and Telecommunications Research Institute, Daejeon (KR)

(72) Inventors: Ha Hyun Lee, Seoul (KR); Jin Ho Lee, Daejeon (KR); Jung Won Kang, Daejeon (KR); Jin Soo Choi, Daejeon (KR); Jin Woong Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/509,299

(22) Filed: Jul. 11, 2019

(65) Prior Publication Data
US 2019/0335185 A1    Oct. 31, 2019

Related U.S. Application Data

(63) Continuation of application No. 15/799,803, filed on Oct. 31, 2017, now Pat. No. 10,397,589, which is a (Continued)

(30) Foreign Application Priority Data

Jul. 15, 2013 (KR) .................. 10-2013-0082813
Mar. 17, 2014 (KR) .................. 10-2014-0030739
Jul. 15, 2014 (KR) .................. 10-2014-0089177

(51) Int. Cl.
*H04N 19/31* (2014.01)
*H04N 19/44* (2014.01)
(Continued)

(52) U.S. Cl.
CPC .......... *H04N 19/31* (2014.11); *H04N 19/105* (2014.11); *H04N 19/157* (2014.11);
(Continued)

(58) Field of Classification Search
CPC .... H04N 19/31; H04N 19/157; H04N 19/463; H04N 19/172; H04N 19/70;
(Continued)

(56) References Cited

U.S. PATENT DOCUMENTS

2006/0120450 A1    6/2006  Han et al.
2009/0147848 A1    6/2009  Park et al.
(Continued)

FOREIGN PATENT DOCUMENTS

CN    101385355 A    3/2009
JP    2016504859 A    2/2016
(Continued)

OTHER PUBLICATIONS

Chen, Jianle et al., "SHVC Working Draft 2," Joint Collaborative Team on Video Coding (JCT-VC) of ITU-T SG16 WP3 and ISO/IEC JTC1/SC29/WG11, Apr. 18-26, 2013, 13th Meeting: Incheon, Republic of Korea.
(Continued)

*Primary Examiner* — Marnie A Matt
(74) *Attorney, Agent, or Firm* — William Park & Associates Ltd.

(57) ABSTRACT

The present invention relates to a method for predicting an inter-layer of an image having a plurality of layers including at least one temporal sub-layer. The method according to present invention comprises the steps of: acquiring information on a temporal sub-layer for inter-layer prediction; inducing a reference picture used for predicting an inter-layer of a current picture on the basis of the information on the temporal sub-layer; and predicting the inter-layer of the current picture on the basis of the reference picture.

7 Claims, 5 Drawing Sheets

Related U.S. Application Data continuation of application No. 14/650,673, filed as application No. PCT/KR2014/006401 on Jul. 15, 2014, now Pat. No. 9,838,702.

(51) Int. Cl.

| | | |
|---|---|---|
| *H04N 19/51* | (2014.01) | |
| *H04N 19/70* | (2014.01) | |
| *H04N 19/105* | (2014.01) | |
| *H04N 19/157* | (2014.01) | |
| *H04N 19/172* | (2014.01) | |
| *H04N 19/184* | (2014.01) | |
| *H04N 19/187* | (2014.01) | |
| *H04N 19/463* | (2014.01) | |

(52) U.S. Cl.
CPC ......... *H04N 19/172* (2014.11); *H04N 19/184* (2014.11); *H04N 19/187* (2014.11); *H04N 19/44* (2014.11); *H04N 19/463* (2014.11); *H04N 19/51* (2014.11); *H04N 19/70* (2014.11)

(58) Field of Classification Search
CPC .... H04N 19/105; H04N 19/184; H04N 19/51; H04N 19/187; H04N 19/44
USPC ................................................... 375/240.12
See application file for complete search history.

(56) References Cited

U.S. PATENT DOCUMENTS

| | | | |
|---|---|---|---|
| 2009/0168875 A1* | 7/2009 | Park | ................. H04N 19/103 375/240.12 |
| 2009/0175359 A1 | 7/2009 | Jeon et al. | |
| 2009/0180537 A1 | 7/2009 | Park et al. | |
| 2009/0213934 A1 | 8/2009 | Park et al. | |
| 2009/0220000 A1 | 9/2009 | Park et al. | |
| 2009/0220008 A1 | 9/2009 | Park et al. | |
| 2010/0061456 A1 | 3/2010 | Park | |
| 2010/0195714 A1 | 8/2010 | Park et al. | |
| 2010/0316124 A1 | 12/2010 | Park et al. | |
| 2012/0183076 A1 | 7/2012 | Boyce et al. | |
| 2012/0183077 A1 | 7/2012 | Hong et al. | |
| 2012/0269276 A1 | 10/2012 | Hong et al. | |
| 2012/0275517 A1 | 11/2012 | Boyce et al. | |
| 2014/0161190 A1* | 6/2014 | Park | ................. H04N 19/33 375/240.16 |
| 2014/0247883 A1 | 9/2014 | Lee et al. | |
| 2014/0301458 A1 | 10/2014 | Rapaka et al. | |
| 2015/0334399 A1* | 11/2015 | Hendry | ................. H04N 19/33 375/240.12 |
| 2016/0261924 A1 | 9/2016 | Hwang et al. | |

FOREIGN PATENT DOCUMENTS

| | | |
|---|---|---|
| JP | 2016519853 A | 7/2016 |
| KR | 1020060063532 A | 6/2006 |
| KR | 1020130037193 A | 4/2013 |

OTHER PUBLICATIONS

Ikai, Tomohiro et al., "MV-HEVC/SHVC HLS: TemporalID alignment and inter-layer prediction restriction," Joint Collaborative Team on Video Coding (JCT-VC) of ITU-T SG 16 WP 3 and ISO/IEC JTC 1/SC 29/WG 11, Jul. 25-Aug. 2, 2013, 14th Meeting: Vienna, Austria.

Thang, Truong Cong et al., "Proposal to the Extension of Video Parameter Set," Joint Collaborative Team on Video Coding (JCT-VC) of ITU-T SG 16 WP 3 and ISO/IEC JTC 1/SC 29/WG 11, Jan. 14-23, 2013, 12th Meeting: Geneva, Switzerland.

\* cited by examiner

METHOD AND APPARATUS FOR PREDICTING INTER-LAYER BASED ON TEMPORAL SUB-LAYER INFORMATION

TECHNICAL FIELD

The present invention relates to inter-layer prediction to code and decode an upper layer using information of a lower layer as image encoding and decoding technology of a multi-layered structure. More particularly, the present invention relates to an efficient signaling method for performing inter-layer prediction based on temporal sub-layer information.

BACKGROUND ART

In recent years, as a multimedia environment is established, various terminals and networks have been used and accordingly requirements of a user have been diversified.

For example, as the performance and computing capability of a terminal are diversified, the supported performance has been also diversified for each device. Further, a network such as a wired/wireless network through which information is transmitted has various functions such as an outer appearance structure, a form of transmitted information, and information amount and rate. The user selects a terminal and a network to be used according to a desired function. In addition, spectrums of the terminal and the network provided to the user from an enterprise have been diversified.

Accordingly, recently, broadcasting having a High Definition (HD) resolution has been domestically and internationally extended and served so that many users are accustomed to seeing an image with a high resolution and high quality. Thus, a plurality of image service relation centers has greatly attempted to develop a next generation image device.

In addition, as there is growing interest in HDTV and Ultra High Definition (UHD) with resolution of four times or greater than the HDTV, there is a great need for a technology to compress and process a high quality image with high resolution.

In order to compress and process the image, an inter prediction technology of predicting a pixel value included in a picture between previous and/or next pictures and a current picture, an intra prediction technology of predicting other pixel value included in the current picture using pixel information in the current picture, and an entropy encoding technology of allocating a short code to a symbol with high appearance frequency and allocating a long code to a symbol with low appearance frequency may be used.

As described above, when considering respective terminals and networks having different supported functions and various requirements of the user, there is a demand to change the quality, the size, and a frame of the supported image.

In this way, due to heterogeneous communication networks and various functions and types of terminals, scalability variously supporting the quality, the resolution, the size, and a frame rate, a view of the image becomes an important function of a video format.

Accordingly, in order to provide a service required by a user in various environments based on a high-efficiency video encoding method, there is a need to provide a scalability function so that efficient video encoding and decoding may be performed in time, space, image quality, and view sides.

DISCLOSURE

Technical Problem

The present invention has been made in an effort to solve the above problems, and provides an inter-layer prediction method based on temporal sub-layer information and an apparatus thereof.

The present invention further provides a method of efficiently signaling information by allocating an indicator to control inter-layer prediction based on temporal sub-layer information and an apparatus thereof.

The present invention further provides a method of applying the same maximum temporal sub-layer information to all layers in a multi-layered structure.

Technical Solution

According to an aspect of the present invention, there is provided an inter-layer prediction method of an image including a plurality of layers having at least one temporal sub-layer. The inter-layer prediction method may include acquiring information on the temporal sub-layer for inter-layer prediction, inducing a reference picture to be used for inter-layer prediction of a current picture based on the information on the temporal sub-layer, and performing the inter-layer prediction of the current picture based on the reference picture.

The information on the temporal sub-layer may comprise maximum temporal sub-layer information indicating a maximum temporal sub-layer which is referred for the inter-layer prediction in each layer, and indicator information indicating whether to control the maximum temporal sub-layer information in each layer.

According to another aspect of the present invention, there is provided an inter-layer prediction apparatus of an image including a plurality of layers having at least one temporal sub-layer. The inter-layer prediction apparatus may include an entropy coder to acquire information on the temporal sub-layer for inter-layer prediction, and a predictor to induce a reference picture to be used for inter-layer prediction of a current picture based on the information on the temporal sub-layer, and to perform the inter-layer prediction of the current picture based on the reference picture.

The information on the temporal sub-layer may comprise maximum temporal sub-layer information indicating a maximum temporal sub-layer which is referred for the inter-layer prediction in each layer, and indicator information indicating whether to control the maximum temporal sub-layer information in each layer.

Advantageous Effects

Relation information can be efficiently signaled for inter-layer prediction by allocating an indicator or an identification to control inter-layer prediction based on temporal sub-layer information. Since separate transmission of the maximum temporal sub-layer information with respect to all reference layers is omitted by applying the same maximum temporal sub-layer information to all the reference layers in a multi-layered structure, signaling overhead of the relation information can be reduced.

MODE FOR INVENTION

Embodiments may be described with reference to appended drawings. In the following description, if detailed description about well-known functions or configurations may make the subject matter of the disclosure unclear, the detailed description will be omitted.

In addition, when a component is referred to as being "connected to" or "linked to" another component, the component may be directly connected to or linked to another component or an intervening component may be present therebetween. In contrast, if a component is referred to as being "directly connected to" or "directly linked to" another component, an intervening component may not be present therebetween.

The terms "first" and "second" can be used to refer to various components, but the components may not be limited to the above terms. The terms will be used to discriminate one component from the other component. For instance, the first component may be referred to the second component and vice versa without departing from the right of the disclosure.

Further, although an embodiment of the present invention independently illustrates constituent elements in order to represent different characteristic functions, it does not mean that the respective constituent elements are composed by a separated hardware or one software constituent unit. That is, respective constituent elements include respective arranged constituent elements for the purpose of convenience, and at least two of the constituent elements may constitute one constituent element, or one constituent element may be divided into a plurality of constituent elements to perform functions. An integrated example and a separated example of each configuration will fall within the spirit and scope of the principles of the present invention.

Further, some of constituent elements may be a selective constituent element to simply improve a performance instead of an essential constituent element for performing an essential function. The present invention may be realized by including only an essential constituent element to implement the scope of the present invention except for constituent elements used to simply improve the performance. A structure including only essential constituent elements except for a selective constituent element used to simply improve the performance is included in the scope of the present invention.

Figure 1:
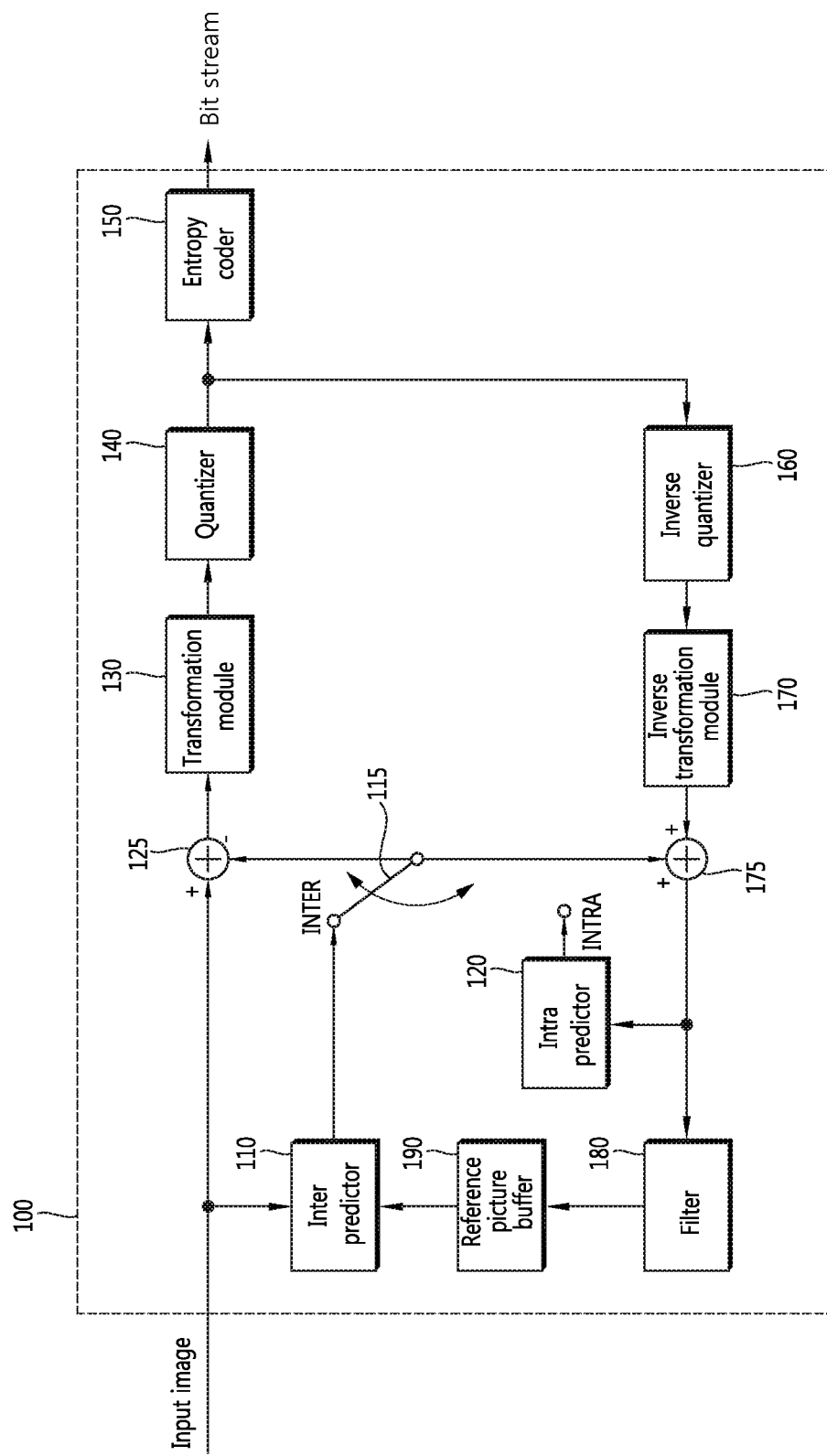
FIG. 1 is a block diagram illustrating a configuration of an image coding device according to an exemplary embodiment of the present invention.

FIG. 1 is a block diagram illustrating a configuration of an image coding device according to an exemplary embodiment of the present invention.

A scalable video coding device supporting a multi-layered structure may be implemented by extending a general image coding device of a single layered structure. The block diagram of FIG. 1 illustrates an embodiment of an image coding device which may become a base of a scalable video decoding device applicable to a multi-layered structure.

Referring to FIG. 1, the image coding device 100 includes an inter predictor 110, a switch 115, an intra predictor 120, a subtractor 125, a transformation module 130, an quantizer 140, an entropy coder 150, an inverse quantizer 160, an inverse transformation module 170, an adder 175, a filter 180, and a reference picture buffer 190.

The image coding device 100 may code an input image to an intra mode or an inter mode to output a bit stream.

In the intra mode, the switch 115 may be switched to an intra. In the inter mode, the switch 115 may be switched to an inter. Intra prediction means prediction in a screen, and an inter prediction means prediction between screens. The image coding device 100 may generate a prediction block with respect to an input block of an input image to code a residual between the input block and the prediction block. In this case, the input image may mean an original picture.

In a case of the intra mode, the intra predictor 120 may use a sample value of image encoded/decoded blocks around a current block as a reference sample. The intra predictor 120 may perform spatial prediction using the reference sample to generate prediction samples with respect to the current block.

In a case of the inter mode, the inter predictor 110 may obtain a motion vector specifying a reference block having the smallest difference from the input block (current block) from the reference picture stored in the reference picture buffer 190 in a motion prediction procedure. The inter predictor 110 may generate a prediction block with respect to the current block by performing motion compensation using a motion vector and the reference picture stored in the reference picture buffer 190.

In a case of the multi-layered structure, inter prediction applied to the inter mode may include inter-layer prediction. The inter predictor 110 may sample a picture of a reference layer to configure an inter-layer reference picture, and may perform inter-layer prediction by adding the inter-layer reference picture to a reference picture list. A reference relation between layers may be signaled through information specifying dependency between layers.

Meanwhile, sampling applied to a reference layer picture when the current layer picture and the reference layer picture have the same size, may mean generation of the reference sample according to sample copy from the reference layer picture. Sampling applied to the reference layer picture when the current layer picture and the reference layer picture have different resolutions, may mean up sampling.

For example, as a case of different resolutions between layers, the inter-layer reference picture may be configured by up-sampling a reconstructed picture of a reference layer between layers supporting scalability with respect to the resolution.

The inter layer reference picture may be configured in consideration of a coding cost using a picture of a certain layer. The coding device may transmit information specifying a layer to which a picture to be used as the inter layer reference picture belongs to the decoding device.

Further, a picture used for prediction of a current block in a layer referred in the inter-layer prediction, that is, a reference layer may be a picture of the same Access Unit (AU) as that of a current picture (a prediction target picture in the current layer).

The subtractor 125 may generate a residual block according to a residual between the input block and the generated prediction block.

The transformation module 130 may transform the residual block to output a transform coefficient. In this case, the transform coefficient may mean a coefficient value generated by transforming the residual block and/or the residual signal. Hereinafter, in the specification, a quantized transform coefficient level generated by quantizing the transform coefficient may refer to a transform coefficient.

When a transform skip mode is applied, the transformation module 130 may skip transformation with respect to the residual block.

The quantizer 140 may quantize the input transform coefficient according to a quantization parameter to output a quantized coefficient. The quantized coefficient may refer to a quantized transform coefficient level. In this case, the quantizer 140 may quantize the input transform coefficient using a quantization matrix.

The entropy coder 150 may entropy-code values calculated from the quantizer 140 or a coding parameter value calculated during a coding procedure according to probability distribution to output a bit stream. The entropy coder 150 may entropy-code information (for example, a syntax element and the like) for video decoding except for pixel information of a video.

The coding parameter is information necessary for coding and decoding, which may include information encoded by the coding device and transmitted to the decoding device and information which may be analogized during a coding or decoding procedure.

For example, the coding parameter may include values or statistics such as intra/inter prediction modes, a motion vector, a reference image index, a coding block pattern, presence of a residual signal, a transform coefficient, a quantized transform coefficient, a quantization parameter, a block size, and block division information.

The residual signal may mean a difference between the original signal and the prediction signal. Further, the difference between the original signal and the prediction signal may mean a transformed signal or a signal obtained by transforming or quantizing the difference between the original signal and the prediction signal. The residual signal may refer to a residual block in a block unit.

When the entropy coding is applied, the size of a bit stream with respect to the coding target symbols may be reduced by allocating the small number of bits to a symbol having a high generation probability and allocating the large number of bits to a symbol having a low generation probability to express the symbol. Accordingly, a compression performance of image coding may be increased through the entropy coding.

The entropy coder 150 may use a coding method such as exponential golomb, Context-Adaptive Variable Length Coding (CAVLC), and Context-Adaptive Binary Arithmetic Coding (CABAC) for entropy coding. For example, the entropy coder 150 may perform entropy coding using Variable Length Coding/Code (VLC). Further, the entropy coder 150 may obtain a binarization method of a target symbol and a probability model of a target symbol/bin to perform entropy coding using the obtained binarization method of the target symbol and probability model of the target symbol/bin.

Since the image coding device 100 according to an embodiment of FIG. 1 performs inter prediction coding, that is, prediction coding between screens, there is a need to decode and store a current coded image to be used as a reference image. Accordingly, the quantized coefficient is inversely quantized by the inverse quantizer 160 and may be inversely transformed by the inverse transformation module 170. The adder 175 adds the inversely quantized and inversely transformed coefficient to a prediction block to generate a reconstructed block.

The reconstructed block is filtered by the filter 180. The filter 180 may apply at least one of a deblocking filter, Sample Adaptive Offset (SAO), and Adaptive Loop Filter (ALF) to the reconstructed block or the reconstructed picture. The filter 180 may refer to an adaptive in-loop filter. The deblocking filter may remove a block distortion generated at a boundary between blocks. The SAO may add a proper offset value to a pixel value in order to compensate for a coding error. The ALF may perform filtering based on a comparison value of the reconstructed image with an original image. The reconstructed block passing through the filter 180 may be stored in the reference picture buffer 190.

Figure 2:
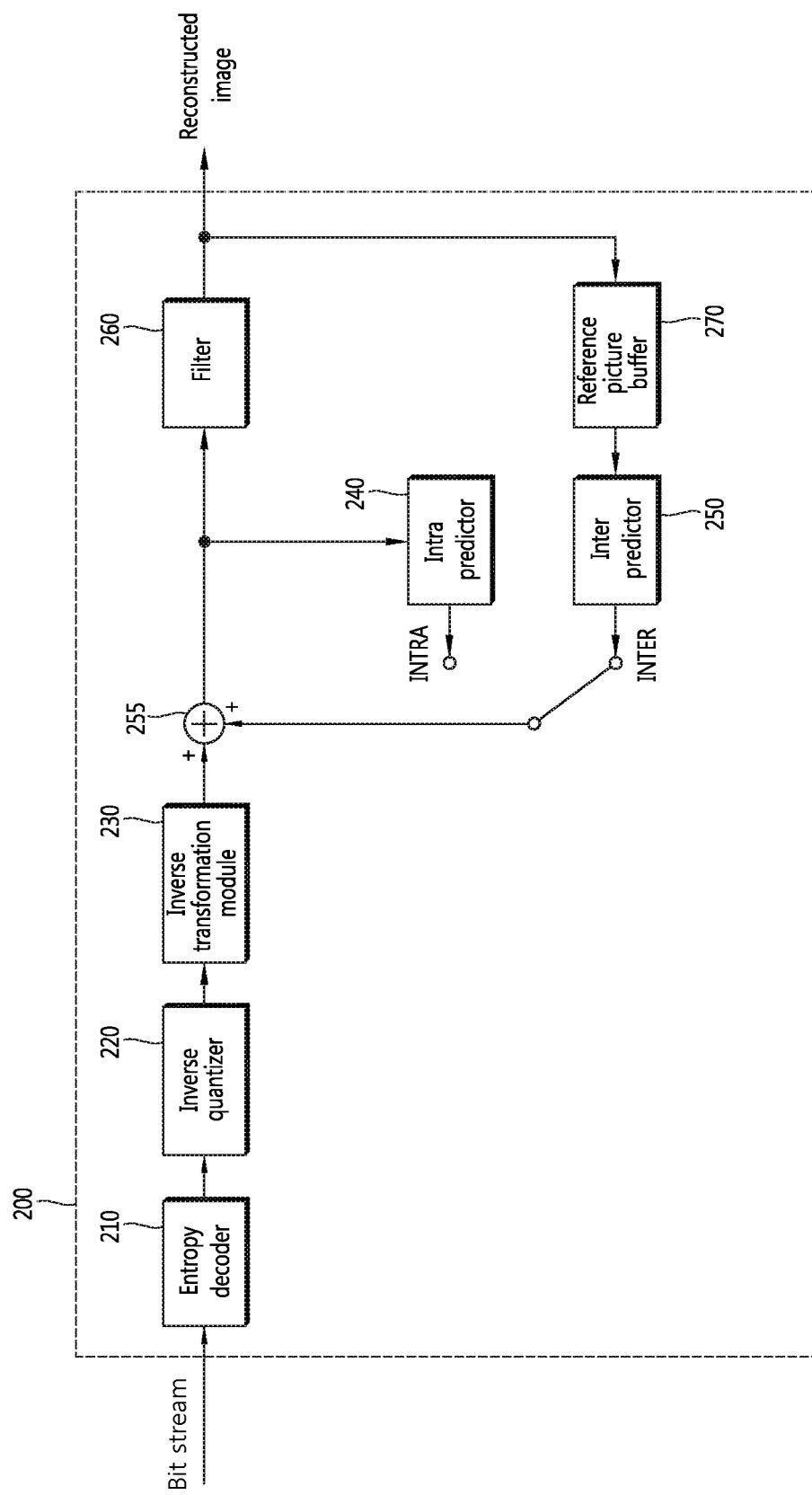
FIG. 2 is a block diagram illustrating a configuration of an image decoding device according to an exemplary embodiment of the present invention.

FIG. 2 is a block diagram illustrating a configuration of an image decoding device according to an exemplary embodiment of the present invention.

A scalable video decoding device supporting a multi-layered structure may be implemented by extending a general image coding device of a single layered structure. The block diagram of FIG. 2 illustrates an embodiment of an image decoding device which may become a base of a scalable video decoding device applicable to a multi-layer structure.

Referring to FIG. 2, the image decoding device 200 includes an entropy decoder 210, an inverse quantizer 220, an inverse transformation module 230, an intra predictor 240, an inter predictor 250, an adder 255, a filter 260, and a reference picture buffer 270.

The image decoding device 200 may receive and decode a bit stream output from the image coding device 100 to an intra mode or an inter mode to output a reconfigured image, that is, reconstructed image.

In the intra mode, the switch 115 is switched to an intra. In the inter mode, the switch 115 may be switched to an inter.

The image decoding device 200 may obtain a reconstructed residual block from the input bit stream to generate a prediction block, and may add the reconstructed residual block to the prediction block to generate the reconfigured block, that is, the reconstructed block.

The entropy decoder 210 may entropy-decode the input bit stream according to a probability distribution to output information such as a quantized coefficient and the syntax element.

The quantized coefficient is inversely quantized by the inverse quantizer 220 and is inversely transformed by the inverse transformation module 230. The quantized coefficient is inversely quantized/inversely transformed so that the reconstructed residual block may be generated. In this case, the inverse quantizer 220 may apply the quantization matrix to the quantized coefficient.

In a case of the intra mode, the intra predictor 240 may perform spatial prediction using a sample value of image decoded block around a current block to generate prediction samples with respect to the current block.

In a case of the inter mode, the inter predictor 250 may generate a prediction block with respect to the current block by performing motion compensation using a motion vector and the reference picture stored in the reference picture buffer 270.

In a case of the multi-layered structure, inter prediction applied to the inter mode may include an inter-layer prediction. The inter predictor 250 may sample a picture of a reference layer to configure an inter-layer reference picture, and may perform an inter-layer prediction by adding the inter-layer reference picture to a reference picture list. A reference relation between layers may be signaled through information specifying dependency between layers.

Meanwhile, sampling applied to a reference layer picture when the current layer picture and the reference layer picture have the same size, may mean generation of the reference sample according to sample copy from the reference layer picture. Sampling applied to the reference layer picture when the current layer picture and the reference layer picture have a different resolution, may mean up sampling.

For example, as a case of different resolutions between layers, inter-layer prediction is applied between layers supporting scalability with respect to the resolution, the inter-layer reference picture may be configured by up-sampling a reconstructed picture of a reference layer.

In this case, the coding device may transmit information specifying a layer to which a picture to be used as the inter-layer reference picture belongs to the decoding device.

Further, a picture used for prediction of a current block in a layer referred in the inter-layer prediction, that is, a reference layer may be a picture of the same Access Unit (AU) as that of a current picture (a prediction target picture in the current layer).

The adder 255 adds the reconstructed residual block to the prediction block to generate the reconstructed block. In other words, the reconstructed residual block is added to the prediction block so that the reconstructed sample or the reconstructed picture is generated.

The reconstructed picture is filtered by the filter 260. The filter 260 may apply at least one of a deblocking filter, SAO, and an ALF to the reconstructed block or the reconstructed picture. The filter 260 outputs the modified or filtered reconstructed picture. The reconstructed image is stored in the reference picture buffer 270 and may be used for inter prediction.

Further, the image decoding device 200 may further include a parsing unit (not shown) to parse information on an encoded image included in the bit stream. The parsing unit may include an entropy decoder 210, and may be included in the entropy decoder 210. The parsing unit may be implemented by one constituent element of the decoding unit.

Although FIGS. 1 and 2 illustrate that one decoding device/decoding device processes all of coding/decoding with respect to a multi-layer, this is illustrative purpose only and the coding device/decoding device may be configured by layers.

In this case, the coding device/decoding device of an upper layer may perform coding/decoding of a corresponding upper layer using information of the upper layer and information of the lower layer. For example, a predictor (inter-predictor) of the upper layer may perform intra prediction or inter prediction with respect to the current block using pixel information or picture information of the upper layer. The predictor of the upper layer may receive picture information reconstructed from the lower layer to perform inter prediction (inter-layer prediction) with respect to the current block of the upper layer using the received picture information. The prediction between layers is illustrative purpose only. Although the coding device/decoding device are configured by layers or one device processes a multi-layer, the devices may perform coding/decoding a current layer using information of another layer.

In the present invention, the layer may include a view. In this case, in a case of the inter-layer prediction, prediction of the upper layer is not solely performed using information of the lower layer. That is, the inter-layer prediction may be performed using information of another layer between specified layers having dependency according to information specifying dependency between layers.

Figure 3:
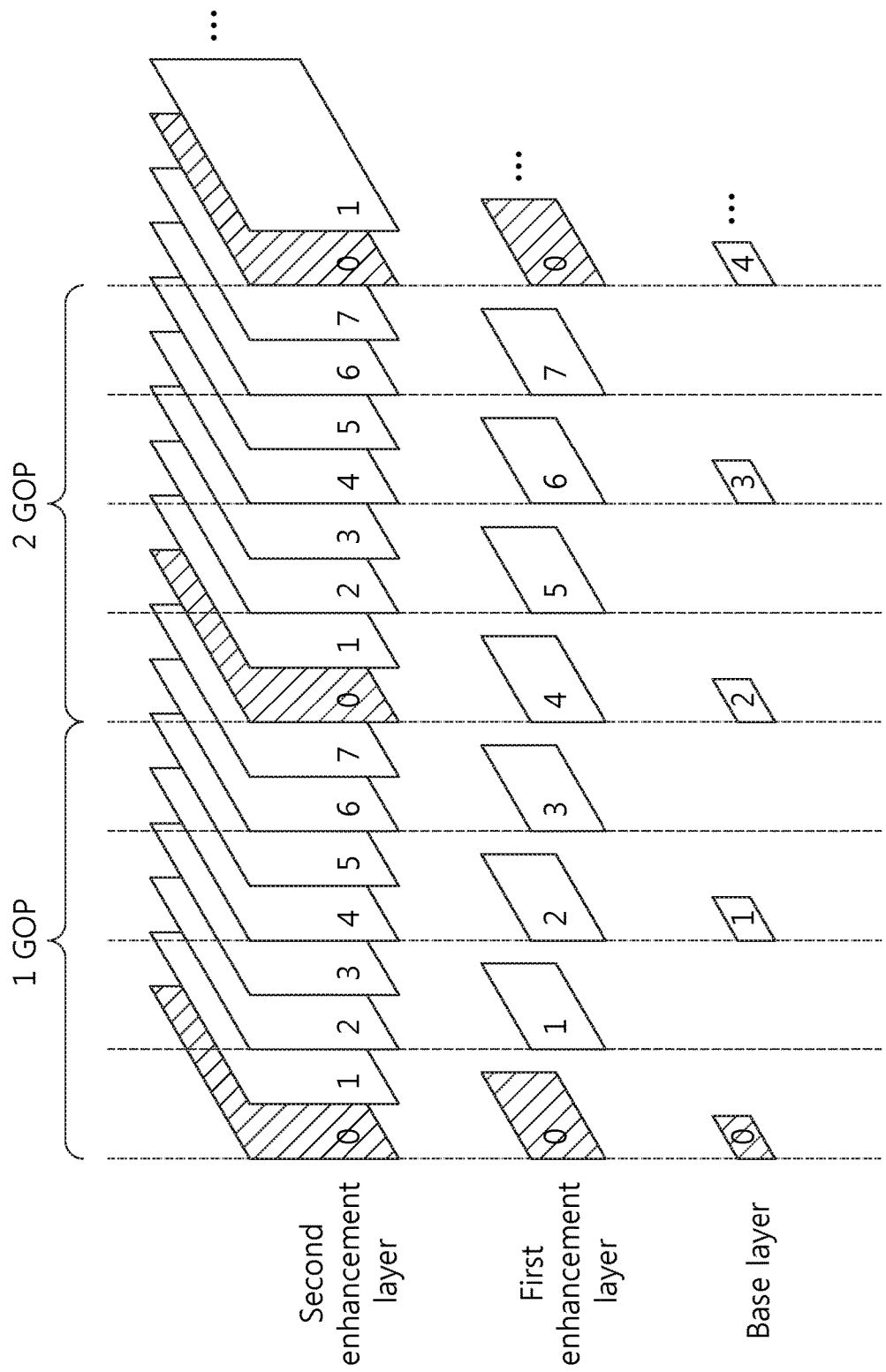
FIG. 3 is a conceptual diagram schematically illustrating an example of a scalable video coding structure using a plurality of layers according to an exemplary embodiment of the present invention.

FIG. 3 is a conceptual diagram schematically illustrating an example of a scalable video coding structure using a plurality of layers according to an exemplary embodiment of the present invention. In FIG. 3, a Group of Picture (GOP) represents a picture group.

There is a need for a transmission medium in order to transmit image data. The performance of the transmission medium is changed by transmission media according to various network environments. A scalable video coding method may be provided for application in the various transmission media or network environment.

A video coding method supporting scalability (hereinafter referred to 'scalable coding' or 'scalable video coding' is a coding method to increase encoding and decoding performances by removing redundancy between layers using text information, motion information, and a residual signal between layers. The scalable video coding method may provide various scalabilities in spatial, temporal, image quality (or quality), and view aspects according to peripheral conditions such as a transmission bit rate, a transmission error rate, and a system resource.

The scalable video coding may be performed using a multi-layer structure so that a bit stream applicable to various network situations may be provided. For example, the scalable video coding structure may include a base layer to compress and process image data using a general image decoding method. The scalable video coding structure may include decoding information of the base layer and an enhancement layer to compress and process image data together using the general image decoding method.

The base layer may refer to a lower layer. The enhancement layer may refer to an enhancement layer or a lower layer. In this case, the lower layer may mean a layer supporting scalability lower than that of a specific layer. The upper layer may mean a layer supporting scalability higher than that of the specific layer. Further, a layer referred in coding/decoding of another layer may refer to a reference layer, and a coded/decoded layer using another layer may refer to a current layer. The reference layer may be a layer lower than the current layer, and the current layer may be a layer higher than the reference layer.

The layer means a group of an image and a bit stream classified based on a space (for example, an image size, temporal (for example, a decoding order, an image output order, and a frame rate), image quality, complexity, a view, and the like.

Referring to FIG. 3, for example, the base layer may be defined by standard definition (SD), a frame rate of 15 Hz, and 1 Mbps bit rate. The first enhancement layer may be defined as high definition (HD), a frame rate of 30 Hz, and 3.9 Mbps bit rate. The second enhancement layer may be defined as 4K-UHD (ultra high definition), a frame rate of 60 Hz, and 27.2 Mbps bit rate.

The format, the frame rate, and the bit rate may be changed as necessary as one example. Further, the number of used layers is not limited the present embodiment and may be changed according to situation. For example, if the transmission bandwidth is 4 Mbps, the first enhancement layer of a frame rate having 15 Hz or less may be transmitted by reducing a frame rate of the first enhancement layer HD.

The scalable video coding method may provide temporal, spatial, image quality, and view scalabilities according the above method in an embodiment of FIG. 3. In the specification, the scalable video coding has the same meaning as that of scalable video encoding in an encoding aspect, and that of scalable video decoding.

As described above, the scalable video coding may include a multi-layered structure in order to providing temporal, spatial, image quality, and view scalabilities. Since a scalable video coding structure supporting a plurality of layers has strong correlation between layers, when performing coding/decoding using the correlation, a redundancy element of data may be removed and coding/decoding performance of the image may be improved.

For example, in the multi-layered structure, when predicting a picture (image) of a layer (current layer) in which coding/decoding is performed, inter-prediction or intra-prediction using information of a current layer, inter-layer prediction using information of another information may be performed.

A plurality of layers may have at least one of a different resolution, a different frame rate, a different color format, and a different view. Further, each layer may be configured by at least one temporal sub-layer which is temporally scaled. In other words, the scalable video coding may include a structure with a plurality of layers having at least one temporal sub-layer.

As described above, when the inter-layer prediction is performed in the scalable video coding having a plurality of layers with at least one temporal sub-carrier, a layer in which a current inter-layer prediction is performed needs information on a reference layer to be referred for inter-layer prediction, and needs information whether a temporal sub-carrier included in the reference layer may be referred for the inter-layer prediction.

Hereinafter, the present invention provides a method to efficiently express and signal information on whether a temporal sub-layer of each layer may be referred for inter-layer prediction and a method of performing inter-layer prediction based on the signaled information.

Figure 4:
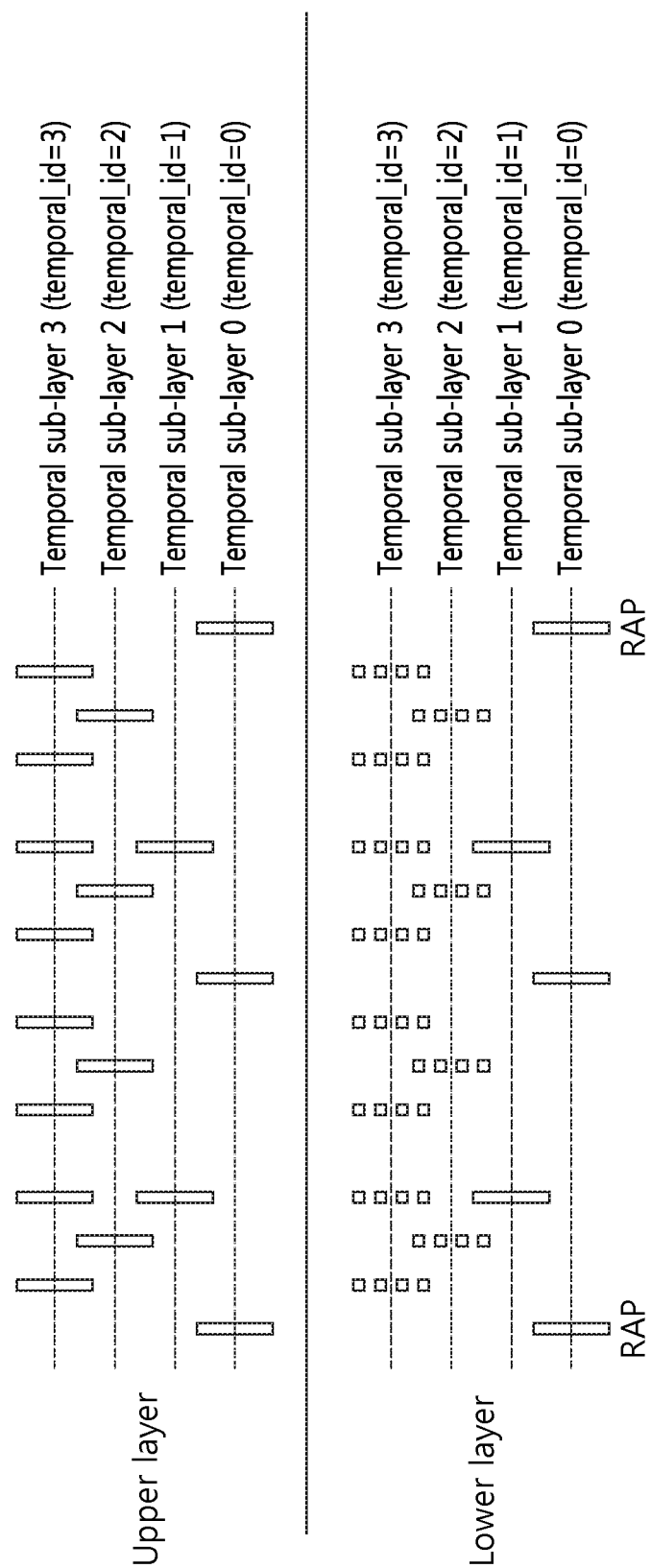
FIG. 4 is a diagram illustrating an example illustrating a layer structure of a scalable video coding according to an exemplary embodiment of the present invention.

FIG. 4 is an example illustrating a layer structure of a scalable video coding according to an exemplary embodiment of the present invention.

For the purpose of convenience of the description, although FIG. 4 illustrates an image having two layers, an image having at least three layers may be extended and applied. Further, a layer structure of scalable video coding may provide spatial, image quality, and view scalabilities. Each layer may include temporal sub-layers to support the temporal scalability. Although the embodiment of FIG. 4 illustrates that each layer is configured by four temporal sub-layers for the purpose of convenience which is illustrative purpose only, and each layer may be configured by the different number of temporal sub-layers.

In the scalable video coding structure shown in FIG. 4, when the upper layer performs inter-layer prediction, there is a need for information on a temporal sub-layer of a reference layer which may be referred for inter layer prediction at an upper layer.

Accordingly, the coding device may determine a temporal sub-layer allowing inter-layer prediction at each layer except for the uppermost layer and may signal the information by a decoder. Further, the decoding device may recognize whether a temporal sub-layer of each layer may be referred for inter-layer prediction at an upper layer through the signaled information. The inter-layer prediction may be performed based on the temporal sub-layer information of each layer which may be referred.

For example, as shown in FIG. 4, when each layer is configured by four temporal sub-layers, the coding device may determine not to allow inter-layer prediction with respect to time sub-layers of a lower layer having a temporal level greater than or equal to 2 (may be an identifier specifying a temporal sub-layer, for example, temporal_id), but to allow inter-layer prediction with respect to temporal sub-layers of a lower layer having a temporal level lower than 2. Referring to FIG. 4, inter-layer prediction with respect to temporal sub-layers "0" and "1" is allowed (that is, may be referred for inter-layer prediction of the upper layer), pictures (marked with a bar) may be used as a reference picture for inter-layer prediction of the upper layer. Further, since temporal sub-layers "2" and "3" of a lower layer having a temporal level of 2 or greater is not allowed (that is, may not reference for inter-layer prediction), pictures (bar marked with a dotted line in FIG. 4) corresponding to temporal sub-layers "2" and "3" of the lower layer may not be used as a reference picture for inter-layer prediction of the upper layer.

That is, the coding device may determine whether temporal sub-layer pictures included in each layer except for the uppermost layer, and may signal temporal sub-layer information of each layer determined using a syntax element. The decoding device may decode the signaled temporal sub-layer information of each layer from the coding device, may determine whether temporal sub-layer pictures included in each layer may be used as a reference picture for the inter-layer prediction based on the decoded information. Further, the decoding device may perform the inter-layer prediction based on information on the reference picture.

Hereinafter, a method of efficiently signaling information on a temporal sub-layer for inter-layer prediction will be described. As described above, information on the temporal sub-layer for the inter-layer prediction refers to information capable of recognizing the temporal sub-layer allowing the inter-layer prediction in a reference layer. In detail, the information on the temporal sub-layer for the inter-layer prediction means which the temporal sub-layer picture of the reference layer is used as a reference picture of a layer (upper layer) performing inter-layer prediction.

The information on the temporal sub-layer for the inter-layer prediction may be transmitted through Video Parameter Sets (VPS), Sequence Parameter Sets (SPS), Picture Parameter Sets (PPS), and a slice segment header.

In detail, information on the temporal sub-layer for inter-layer prediction is expressed using the syntax element with reference to following tables 1 to 11. A method of signaling the information on the temporal sub-layer for inter-layer prediction through a VPS, a SPS, a PPS, and a slice segment header will be described.

Table 1 is an example of a syntax indicating the maximum temporal sub-layer information of each layer except for the uppermost layer which may be transmitted by the VPS according to an embodiment of the present invention.

In this case, the maximum temporal sub-layer information means information on a maximum temporal sub-layer level allowing inter-layer prediction at a corresponding layer. That is, a temporal sub-layer having a temporal level greater than that of the maximum temporal sub-layer information described in a corresponding layer.

TABLE 1

```
vps_extension( ) {
    for( i = 0; i< vps_max_layers_minus1; i++ )
        max_tid_il_ref_pics_plus1[ i ]          u(3)
}
```

Referring to Table 1, the max_tid_il_ref_pics_plus1[i] may represent temporal sub-layer information greatly supporting inter-layer prediction in an i-th layer. For example, a sub-layer having a temporal level temporal_id greater than max_tid_il_ref_pics_plus1[i]−1 at the i-th layer may not be used for inter-layer prediction at an n-th layer (n is a value greater than i) using the i-th layer as the reference layer. In other words, a sub-layer having a temporal level temporal_id less than the max_tid_il_ref_pics_plus1[i] in an i-th layer may be used as a reference picture for inter-layer prediction at an i-th layer (n is a value greater than i) using the i-th layer as the reference layer. In table 1, "vps_max_layers_minus1+1" means the maximum number of layers allowed in a coded video sequence.

As listed in table 1, the maximum temporal sub-layer information max_tid_il_ref_pics_plus1[i] is not transmitted for each layer, but the same maximum temporal sub-layer information is applicable to entire layers.

Table 2 is an example of a syntax indicating the maximum temporal sub-layer information equally applied to all layers which may be transmitted from the VPS according to an embodiment of the present invention.

TABLE 2

| vps_extension( ) { | |
| --- | --- |
| max_tid_il_ref_pics_plus1 | u(3) |
| } | |

Table 3 is another example of a syntax indicating the maximum temporal sub-layer information of each layer except for the uppermost layer which may be transmitted from the VPS according to the embodiment of the present invention.

TABLE 3

| vps_extension( ) { | |
| --- | --- |
| max_tid_il_ref_pics_plus1_present_flag | u(1) |
| if ( max_tid_il_ref_pics_plus1_present_flag) { | |
| for( i = 0; i< vps_max_layers_minus1; i++ ) | |
| max_tid_il_ref_pics_plus1[ i ] | u(3) |
| } | |
| } | |

Referring to the table 3, for example, only when the "max_tid_il_ref_pics_plus1_present_flag" syntax a value of "1", there is "max_tid_il_ref_pics_plus1[i]" information for each layer except for the uppermost layer. As listed in the table 1, the inter-layer prediction may not be allowed with respect to sub-layer pictures having a time level TemporalId higher than a "max_tid_il_ref_pics_plus1[i]−1" value for each layer.

When the "max_tid_il_ref_pics_plus1_present_flag" syntax has a value of "0", it means that there is no "max_tid_il_ref_pics_plus1[i]" information for each layer. In this case, the "max_tid_il_ref_pics_plus1[i]" value at each layer except for the uppermost layer may be analogized as "7" which is allowable maximum time level TemporalId value. That is, the "max_tid_il_ref_pics_plus1[i]" value means that inter-layer prediction may be allowed with respect the entire temporal sub-layer picture of all layers except for the uppermost layer at entire bit stream. In other words, the entire temporal sub-layer picture of all layers in the entire bit streams may be used as the reference picture for the inter-layer prediction.

In the above embodiment, when the "max_tid_il_ref_pics_plus1_present_flag" is "0", it is determined whether the uppermost temporal sub-layer picture of a layer (current layer) in which decoding is currently performed without considering the "max_tid_il_ref_pics_plus1[i]" value, is referred in a layer (upper layer) greater than the current layer. If the uppermost temporal sub-layer picture of the current layer is not referred at the upper layer, the uppermost temporal sub-layer picture of the current layer may be marked with "unused for reference". In this case, the uppermost temporal sub-layer may refer to a sub-layer having the greatest time level at the current layer. The uppermost temporal sub-layer picture of the current layer marked with the "unused for reference" is not used as a reference pictured for inter-layer prediction.

For example, it is assumed that the total number of layers in the scalable coding structure is four, and each of the four layers is configured by four temporal sub-layers Temporal_Id=0-3. In this case, when a currently decoded layer is a second layer, it is confirmed whether a fourth temporal sub-layer Temporal_Id=3 of a second layer is referred by a third layer and a fourth layer. If the uppermost time sub-layer Temporal_Id=3 of the second layer is not referred at third and fourth layers, the uppermost time sub-layer Temporal_Id=3 of the second layer may be marked with "unused for reference".

Table 3-1 is another example of a syntax indicating the maximum temporal sub-layer information which may be transmitted from the VPS according to an embodiment of the present invention.

TABLE 3-1

| vps_extension( ) { | |
| --- | --- |
| ... | |
| max_tid_ref_present_flag | u(1) |
| if ( max_tid_ref_present_flag) | |
| for ( i=0, i < MaxLayersMinus1; i++) | |
| for ( j = i+1; j <= MaxLayersMinus1; j++ ) | |
| if (direct_dependency_flag[j][i]) | |
| max_tid_il_ref_pics_plus1[i][j] | u(3) |
| ... | |

Referring to Table 3-1, for example, when the "max_tid_ref_present_flag" syntax has a value of "1", the maximum temporal sub-layer information (for example, max_tid_il_ref_pics_plus1[i][j]) allowed at an "i"-th layer with respect to a "j"-th layer using an "i"-th layer as a direct reference layer may be separately described.

A reference relation between layers may be analogized from a syntax "direct_dependency_flag[j][i]". The direct_dependency_flag[j][i] may be information indicating whether the i-th layer may be used as a direct reference layer for the j-th layer. For example, when the direct_dependency_flag[j][i] is 0, the i-th layer is not used as a direct reference layer for the j-th layer. In contrast, when the direct_dependency_flag[j][i] is 1, the i-th layer may be used as a direct reference layer for the j-th layer.

When the "max_tid_ref_present_flag" syntax has a value "0", there is no maximum temporal sub-layer information reporting time sub-layer information allowing inter-layer prediction by layers, and a value of the "max_tid_ref_present_flag" syntax may be analogized as "7" which is a maximum time level allowed in the bit stream. When the "max_tid_il_ref_pics_plus1[i][j]" has a value of "0", it is specified that a non-IRAP picture having a 'nuh_layer_id' equal to 'layer_id_in_nuh[i]' may not be used as a reference picture for inter-layer prediction with respect to a picture having a 'nuh_layer_id' equal to 'layer_id_in_nuh[j]'. When the "max_tid_il_ref_pics_plus1[i][j]" has a value greater than "0", it means that pictures having a 'nuh_layer_id' equal to a "max_tid_il_ref_pics_plus1[i][j]" and including time level information TemporalId greater than 'max_tid_il_ref_pics_plus1[i][j]−1' are not used as a reference picture for inter-layer prediction with pictures having a 'nuh_layer_id' equal to a 'layer_id_in_nuh[j]'.

In the table 3-1, the MaxLayersMinus1 is identical with a Min(62, vps_max_layers_minus1) value, and the vps_max_layers_minus1 is information indicating the maximum number of layers allowed in the bit stream transmitted from the VPS.

As described in the table 3, the maximum temporal sub-layer information max_tid_il_ref_pics_plus1[i] is not transmitted for each layer, and the same maximum temporal sub-layer information is applicable to all layers.

Table 4 is another example of a syntax indicating the maximum temporal sub-layer information equally applied to all layers except for the uppermost layer which may be transmitted from the VPS according to the embodiment of the present invention.

TABLE 4

```
vps_extension( ) {
    max_tid_il_ref_pics_plus1_present_flag           u(1)
    if ( max_tid_il_ref_pics_plus1_present_flag) {
        max_tid_il_ref_pics_plus1                    u(3)
    }
}
```

Referring to table 4, when the "max_tid_il_ref_pics_plus1_present_flag" is "0", as described above, if a "max_tid_il_ref_pics_plus1[i]" value is analogized as the maximum time level "7", or if it is determined whether the uppermost time sub-layer of a current layer is referred in layers greater than the current layer without considering the "max_tid_il_ref_pics_plus1[i]" or the uppermost time sub-layer of a current layer is not referred in layers greater than the current layer, the "max_tid_il_ref_pics_plus1[i]" value may be marked with "unused for reference".

When the "max_tid_il_ref_pics_plus1_present_flag" is 0, it may present that the inter-layer prediction is allowed or is not allowed with respect to temporal sub-layers of all layers.

Table 5 is another example of a syntax indicating the maximum temporal sub-information of each layer which may be transmitted from the VPS according to the embodiment of the present invention.

TABLE 5

```
vps_extension( ) {
    for( i = 0; i< vps_max_layers_minus1; i++ ) {
        max_tid_il_ref_pics_plus1_present_flag[i]        u(1)
        if (max_tid_il_ref_pics_plus1_present_flag[i]) {
            max_tid_il_ref_pics_plus1[ i ]               u(3)
        }
    }
}
```

Referring to the table 5, unlike the above table 3, there is max_tid_il_ref_pics_plus1_present_flag[i] by corresponding layers. Only when the flag is 1, the max_tid_il_ref_pics_plus1[i] information is included in the corresponding layer.

When the max_tid_il_ref_pics_plus1_present_flag[i] is 1, the inter-layer prediction may not be allowed with respect to a sub-layer picture having a time level TemporalId greater than that of the max_tid_il_ref_pics_plus1−1 at the i-th layer.

When the max_tid_il_ref_pics_plus1_present_flag[i] has a value of "0", it means that the max_tid_il_ref_pics_plus1[i] information is not included in the i-th layer. In this case, the max_tid_il_ref_pics_plus1[i] may be analogized as "7" which is an allowable maximum time level TemporalId in the bit stream. That is, inter-layer prediction may be allowed with respect to all sub-layer pictures of the i-th layer. In other words, it may represent that all sub-layer pictures of the i-th layer may be used as the reference picture for the inter-layer prediction.

Further, when the max_tid_il_ref_pics_plus1_present_flag is 0, it is determined whether the maximum temporal sub-layer of a currently decoded layer (current layer) without considering the max_tid_il_ref_pics_plus1[i] is referred in layers (upper layer) larger than the current layer. If the maximum temporal sub-layer of the current layer is not referred in the upper layer, the maximum temporal sub-layer of the current layer may be marked with "unused for reference". The maximum temporal sub-layer of the current layer marked with "unused for reference" represents that the maximum temporal sub-layer of the current layer is not used as the reference picture for the inter-layer prediction.

When the max_tid_il_ref_pics_plus1_present_flag is 0, the max_tid_il_ref_pics_plus1_present_flag may indicate that the inter-layer prediction may be allowed or not allowed with respect to the temporal sub-layers of all layers.

Table 6 is another example of a syntax indicating the maximum temporal sub-layer information of each layer which may be transmitted from the VPS according to the embodiment of the present invention.

[Table 6]

TABLE 6

```
vps_extension( ) {
    max_tid_il_ref_pics_plus1_present_flag                        u(1)
    if ( max_tid_il_ref_pics_plus1_present_flag) {
        for( i = 0; i< vps_max_layers_minus1: i++ ) {
            if (i> 0)
                max_tid_il_ref_pics_plus1_not_predicted_flag[i]   u(1)
            if
            (max_tid_il_ref_pics_plus1_not_predicted_flag[i])
                max_tid_il_ref_pics_plus1[ i ]                    u(3)
        }
    }
}
```

Referring to the table 6, only when the max_tid_il_ref_pics_plus1_present_flag has a value of "1", max_tid_il_ref_pics_plus1_not_predicted_flag[i] and max_tid_il_ref_pics_plus1[i] information are present.

Only when max_tid_il_ref_pics_plus1_not_predicted_flag[i] is 1, the max_tid_il_ref_pics_plus1[i] corresponding to the i-th layer may be transmitted. That is, the inter-layer prediction may not be allowed with respect to a sub-layer picture having a time level TemporalId greater than the max_tid_il_ref_pics_plus1−1.

When the max_tid_il_ref_pics_plus1_not_predicted_flag[i] is 0, a value of the max_tid_il_ref_pics_plus1[i−1] of the (i−1)-th layer may be used as a max_tid_il_ref_pics_plus1[i] of the i-th layer. When the max_tid_il_ref_pics_plus1_not_predicted_flag[i] is absent, the max_tid_il_ref_pics_plus1[i] of the i-th layer may be analogized as 1.

When the max_tid_il_ref_pics_plus1_present_flag has a value of "0", max_tid_il_ref_pics_plus1_not_predicted_flag[i] and max_tid_il_ref_pics_plus1[i] information by corresponding layers are absent. In this case, the max_tid_il_ref_pics_plus1[i] may be analogized as "7" which is an allowable maximum time level TemporalId in the bit stream. That is, inter-layer prediction (that is, is used as a reference picture for inter-prediction) may be allowed with respect to all temporal sub-layer pictures in the entire bit stream.

Further, when the max_tid_il_ref_pics_plus1_present_flag is 0, it is determined whether the maximum temporal sub-layer of the current layer is referred with respect to layers larger than the current layer without considering the max_tid_il_ref_pics_plus1[i] value. When the maximum temporal sub-layer of the current layer is not referred with respect to the layers, the maximum temporal sub-layer of the current layer may be marked with "unused for reference".

When the max_tid_il_ref_pics_plus1_present_flag is 0, the inter-layer prediction may be allowed or may not be allowed in the temporal sub-layer of all layers.

Table 7 is another example of a syntax indicating the maximum temporal sub-layer information of each layer which may be transmitted from the VPS according to an embodiment of the present invention.

TABLE 7

```
vps_extension( ) {
    max_tid_il_ref_pics_plus1                               u(3)
    for( i = 0; i < vps_max_layers_minus1; i++ )
        max_tid_il_ref_pics_plus1_predicted_flag[i]         u(1)
        if (!max_tid_il_ref_pics_plus1_predicted_flag[i] )
            max_tid_il_ref_pics_plus1[ i ]                  u(3)
}
```

Referring to Table 7, a max_tid_il_ref_pics_plus1 applicable to the entire layer is transmitted. In addition, when the max_tid_il_ref_pics_plus1_predicted_flag[i] is 1, the max_tid_il_ref_pics_plus1 applicable to the entire layer is used. When the max_tid_il_ref_pics_plus1_predicted_flag[i] is 0, the max_tid_il_ref_pics_plus1[i] value applicable to only a corresponding layer may be described and used.

Table 8 is another example of a syntax indicating the maximum temporal sub-layer information of each layer which may be transmitted from the VPS according to the embodiment of the present invention.

TABLE 8

```
vps_extension( ) {
    for( i = 0; i < vps_max_layers_minus1; i++ ) {
        if ( i > 0 )
            max_tid_il_ref_pics_plus1_predicted_flag[i]     u(1)
        if (max_tid_il_ref_pics_plus1_predicted_flag[i] )
            delta_max_tid_il_ref_pics_plus1[ i ]            u(3)
        else
            max_tid_il_ref_pics_plus1[i]
    }
}
```

Referring to FIG. 8, according to the max_tid_il_ref_pics_plus1_predicted_flag[i] value transmitted from a layer where i is greater than 0, the maximum temporal sub-layer information of each layer may be expressed by a delta value with max_tid_il_ref_pics_plus1[i−1] of a previous layer (i−1).

When the max_tid_il_ref_pics_plus1_predicted_flag is absent, a delta_max_tid_il_ref_pics_plus1[i] may be regarded as 0.

That is, when the max_tid_il_ref_pics_plus1_predicted_flag[i] is 1, the delta_max_tid_il_ref_pics_plus1[i] being a delta value with the previous layer (i−1) is transmitted. When the max_tid_il_ref_pics_plus1_predicted_flag[i] is 0, the max_tid_il_ref_pics_plus1[i] of a corresponding layer is transmitted.

Table 9 is another example of a syntax indicating the maximum temporal sub-layer information of each layer which may be transmitted from the VPS according to the embodiment.

TABLE 9

```
vps_extension( ) {
    ...
    max_tid_il_ref_present_flag                             u(1)
    if ( max_tid_il_ref_present_flag) {
        default_max_tid_il_ref_flag                         u(1)
        if (default_max_tid_il_ref_flag)
            default_max_tid_il_ref_pics_plus1               u(3)
        else {
            for( i = 0; i< MaxLayersMinus1; i++ )
                for ( j = i+1; j <=MaxLayersMinus1; j++ )
                    if (direct_dependency_flag[i][j])
                        max_tid_il_ref_pics_plus1[i][j]     u(3)
        }
    }
    ...
}
```

Referring to Table 9, when a "max_tid_il_ref_present_flag" syntax has a value of "1", the maximum temporal sub-layer information (max_tid_il_ref_pics_plus1[i][j]) allowed in an "i"-th layer with respect to a "j"-th layer using an "i"-th layer as a direct reference layer may be individually described according to a 'default_max_tid_il_ref_flag', or may be analogized as a base value (for example, default_max_tid_il_ref_pics_plus1). When the "max_tid_il_ref_present_flag" syntax has a value of "0", the maximum temporal sub-layer in each layer except for the uppermost layer is absent.

When the "default_max_tid_il_ref_flag" syntax has a value of '1', the 'max_tid_il_ref_pics_plus1[i][j]' syntax is absent. During a decoding procedure, the 'max_tid_il_ref_pics_plus1[i][j]' may be analogized as a 'default_max_tid_il_ref_pics_plus1' value. When the "default_max_tid_il_ref_flag" has a value of '0', there is the maximum temporal sub-layer information (max_tid_il_ref_pics_plus1[i][j]) allowed in an "i"-th layer with respect to an "j"-th layer using the "i"-th layer as the direct reference layer.

When the 'max_tid_il_ref_pics_plus1[i][j]' syntax is present, the "default_max_tid_il_ref_pics_plus1" may be used as "max_tid_il_ref_pics_plus1[i][j]" value. The same maximum temporal sub-layer information is applicable to all layers.

When the "max_tid_il_ref_pics_plus1[i][j]" has a value of "0", a non-IRAP picture having the same 'nuh_layer_id' as a 'layer_id_in_nuh[i]' may be used as a reference picture for inter-layer prediction with respect to a picture having the same 'nuh_layer_id' value as that of a 'layer_id_in_nuh[j]'. When the max_tid_il_ref_pics_plus1[i][j] has a value greater than "0", pictures having the same 'nuh_layer_id' as that of a 'layer_id_in_nuh[i]' and having a time level TemporalId having a value greater than 'max_tid_il_ref_pics_plus1[i][j]−1' is not used as a reference picture for inter-layer prediction with respect to pictures having the same 'nuh_layer_id' as that of the 'layer_id_in_nuh[j]'. When the "max_tid_il_ref_pics_plus1[i][j]" syntax is absent, if the 'max_tid_il_ref_present_flag' syntax is "0", the "max_tid_il_ref_pics_plus1[i][j]" value may be analogized as "7". When the 'max_tid_il_ref_present_flag' syntax is "1", the "max_tid_il_ref_pics_plus1[i][j]" value may be analogized as a 'default_max_tid_il_ref_pics_plus1".

Table 10 is another example of a syntax indicating the maximum temporal sub-layer information of each layer which may be transmitted from the VPS according to the embodiment of the present invention.

TABLE 10

```
vps_extension( ) {
    ...
    default_max_tid_il_ref_flag                          u(1)
    if (default_max_tid_il_ref_flag)
        default_max_tid_il_ref_pics_plus1                u(3)
    else {
        for( i = 0; i< MaxLayersMinus1; i++ )
            for ( j = i+1; j <=MaxLayersMinus1; j++ )
                if (direct_dependency_flag[i][j])
                    max_tid_il_ref_pics_plus1[i][j]      u(3)
    }
    ...
}
```

Referring to Table 10, when the "default_max_tid_il_ref_flag" syntax has a value of '1', if the 'max_tid_il_ref_pics_plus1[i][j]' is absent, the 'max_tid_il_ref_pics_plus1[i][j]' may be analogized as a 'default_max_tid_il_ref_pics_plus1'. When the default_max_tid_il_ref_flag has a value of '0', there is the maximum temporal sub-layer information max_tid_il_ref_pics_plus1[i][j] allowed in an "i"-th layer with respect to an "j"-th layer using the "i"-th layer as a direct reference layer.

When the "max_tid_il_ref_pics_plus1[i][j]" syntax is present, the "default_max_tid_il_ref_pics_plus1" may be used as a "max_tid_il_ref_pics_plus1[i][j]". The same maximum temporal sub-layer information is applicable to all layers.

When the "max_tid_il_ref_pics_plus1[i][j]" has a value of "0", it is specified that a non-IRAP picture having a 'nuh_layer_id' equal to a 'layer_id_in_nuh[i]' may be used as a reference picture for inter-layer prediction with respect to a picture having a 'nuh_layer_id' equal to the 'layer_id_in_nuh[j]'. When the "max_tid_il_ref_pics_plus1[i][j]" has a value greater than "0", it means that pictures having a 'nuh_layer_id' equal to the 'layer_id_in_nuh[i]' and having time level information TemporalId greater than the 'max_tid_il_ref_pics_plus1[i][j]−1' is not used as a reference picture for inter-layer prediction with respect to pictures having a 'nuh_layer_id' equal to the 'layer_id_in_nuh[j]'. When the "max_tid_il_ref_pics_plus1[i][j]" is absent, the "max_tid_il_ref_pics_plus1[i][j]" may be analogized as a "default_max_tid_il_ref_pics_plus1".

Table 11 is another example of a syntax indicating the maximum temporal sub-layer information of each layer which may be transmitted from the VPS according to the embodiment of the present invention.

TABLE 11

```
vps_extension( ) {
    ...
    default_max_tid_il_ref_flag                          u(1)
    if (default_max_tid_il_ref_flag)
        for ( i=0; i< MaxLayerMinus1; i++ )
            default_max_tid_il_ref_pics_plus1[i]         u(3)
    else {
        for( i = 0; i< MaxLayersMinus1; i++ )
            for ( j = i+1; j <=MaxLayersMinus1; j++ )
                if (direct_dependency_flag[i][j])
                    max_tid_il_ref_pics_plus1[i][j]      u(3)
    }
    ...
}
```

Referring to table 11, when the "default_max_tid_il_ref_flag" has a value of '1', if the 'max_tid_il_ref_pics_plus1[i][j]' syntax is absent, the 'max_tid_il_ref_pics_plus1[i][j]' may be analogized as a 'default_max_tid_il_ref_pics_plus1[i]'. When the 'default_max_tid_il_ref_flag' has a value of '0', there is the maximum temporal sub-layer information max_tid_il_ref_pics_plus1[i][j] allowed in an "i"-th layer with respect to an "j"-th layer using the "i"-th layer as a direct reference layer.

When the "max_tid_il_ref_pics_plus1[i][j]" is present, the "default_max_tid_il_ref_pics_plus1[i]" may be used as a "max_tid_il_ref_pics_plus1[i][j]" of the i-th layer. The i may have the value of 0 to MaxLayersMinus1−1. The MaxLayersMinus1 is equal to a Min(62, vps_max_layers_minus1), and the vps_max_layers_minus1 is information indicating the maximum number of layers allowed in a bit stream which is transmitted from the VPS.

When the "max_tid_il_ref_pics_plus1[i][j]" has a value of "0", it is specified that a non-IRAP picture having a 'nuh_layer_id' equal to a 'layer_id_in_nuh[i]' may not be used as a reference picture for inter-layer prediction with respect to a picture having a 'nuh_layer_id' equal to 'layer_id_in_nuh[j]'. When the "max_tid_il_ref_pics_plus1[i][j]" has a value greater than "0", it means that pictures having a 'nuh_layer_id' equal to the 'layer_id_in_nuh[i]' and having time level information TemporalId greater than the 'max_tid_il_ref_pics_plus1[i][j]−1' is not used as a reference picture for inter-layer prediction with respect to pictures having a 'nuh_layer_id' equal to the 'layer_id_in_nuh[j]'. When the max_tid_il_ref_pics_plus1[i][j] is absent, the max_tid_il_ref_pics_plus[i][j] value for an i-th layer may be analogized as a 'default_max_tid_il_ref_pics_plus1[i]'.

A signaling method using temporal sub-layer information according to the embodiment of the present invention may be expressed by a combination of the above embodiments with reference to the above tables 1 to 11.

In addition, the signaling method using temporal sub-layer information according to the embodiment of the present invention may apply the same maximum temporal sub-layer information to all layers without individually reporting the maximum temporal sub-layer information to all layers using a current layer as a direct reference layer when inter-layer prediction is allowed in all temporal sub-layer pictures. Accordingly, overhead may be reduced to separately signal relation information for each layer.

Further, the signaling method using temporal sub-layer information according to the above embodiment of the present invention may efficiently signal relation information by using an indicator indicating whether to control a temporal sub-layer for inter-layer prediction by layers.

When the inter-layer prediction for the current picture is performed using the maximum temporal sub-layer information allowing the inter-layer prediction in a corresponding layer described through the above embodiments, the number numRefLayerPics of reference layer pictures really available for decoding the current picture may be obtained as follows.

Using a variable 'NumDirectRefLayers[ ]' indicating the number of reference layers to which a current layer calculated from a syntax element 'direct_dependency_flag' described in a VPS extension directly refer, a syntax element 'sub_layers_vps_max_minus1[i]' indicating the maximum temporal sub-layer (level) information of each layer, a syntax element 'max_tid_il_ref_pics_plus1[i][j]' information indicating the maximum temporal sub-layer information allowing the inter-layer prediction in each layer, and a syntax element 'TemporalId' indicating time level information of the current picture, a variable 'numRefLayerPics' indicating the number of reference layer pictures available to decode the current picture for the inter-layer prediction may be obtained as illustrated in a follow table 12.

TABLE 12

```
for( i = 0, j = 0; i < NumDirectRefLayers[ nuh_layer_id ]; i++ ) {
    refLayerIdx = LayerIdxInVps[ RefLayerId[ nuh_layer_id ][ i ] ]
    if (( sub_layers_vps_max_minus1[ refLayerIdx ] >=
    TemportId ) &&
            ( max_tid_il_ref_pics_plus1[ refLayerIdx ]
            [LayerIdxInVps[ nuh_layer_id ] ] > TemporalId ))
        refLayerPicIdc[ j++ ] = i
}
numRefLayerPics = j
```

Only pictures of a corresponding reference layer when a 'sub_layers_vps_max_minus1[ ]' of a reference layer is equal to or greater than a 'TemporalId' value of the current picture and a 'max_tid_il_ref_pics_plus1[ ][ ]' of the reference value with respect to the current layer is greater than a 'TemporalId' value of the current picture among pictures of a reference layer to which the current picture directly refers, may be regarded as reference layer pictures available to decode the current picture for inter-layer prediction.

Figure 5:
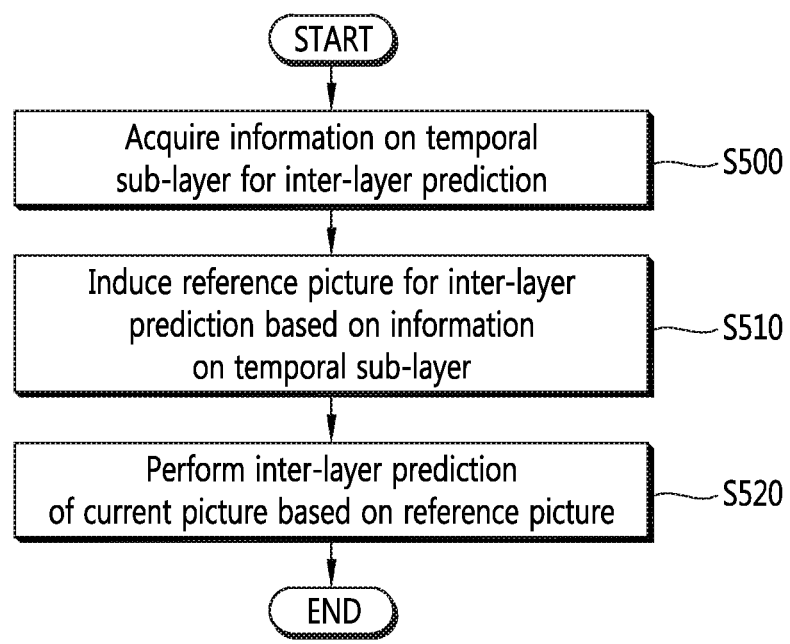
FIG. 5 is a flow chart illustrating an inter-layer prediction method based on temporal sub-layer information according to an exemplary embodiment of the present invention.

FIG. 5 is a flow chart illustrating an inter-layer prediction method based on temporal sub-layer information according to an exemplary embodiment of the present invention.

The method of FIG. 5 describes an inter-layer prediction procedure using temporal sub-layer information in order to generate prediction samples of coding/decoding target block during procedures of coding and decoding an image including a plurality of layers having at least one temporal sub-layer. Accordingly, the method of FIG. 5 is applicable to both of methods of coding and decoding the image. The following description will be made while focusing on the decoding procedure for the purpose of convenience.

Referring to FIG. 5, the decoding device acquires information on a temporal sub-layer for inter-layer prediction (S500).

The information on a temporal sub-layer may include the maximum temporal sub-layer information indicating the maximum temporal sub-layer which may be referred for inter-layer prediction in each layer and indicator information indicating whether to control the maximum temporal sub-layer information in each layer.

For example, the maximum temporal sub-layer information may be a max_tid_il_ref_pics_plus1 syntax element described in the above tables 1 to 11. The indicator information may be a max_tid_il_ref_pics_plus1_present_flag syntax element described in the above tables 1 to 11.

Further, the information on the temporal sub-layer is signaled information to know the temporal sub-layer allowing the inter-layer prediction from a reference layer of a current decoding layer, and may be expressed in various methods described in the above tables 1 to 11.

As illustrated in the above tables 1 to 11, the decoding device may acquire the indicator information, the maximum temporal sub-layer information, and the like by receiving information on the temporal sub-layer from the coding device through a VPS, a SPS, a PPS, a slice segment header, and the like.

For example, when the indicator information indicates to control the maximum temporal sub-layer information in each layer, the decoding device may acquire the largest temporal sub-layer information with respect to each layer. In this case, the decoding device may acquire the maximum temporal sub-layer information on a layer having direct reference relation based on information on reference relation between layers, for example, information (for example, direct_dependency_flag) on a layer using the current layer as a direct reference layer. Conversely, when the indicator information indicates not to explicitly control the maximum temporal sub-layer information in each layer, the decoding device may analogize the maximum temporal sub-layer information with respect to each layer as a specific value. For example, the specific value may be 7 which is the maximum time level.

The decoding device induces a reference picture to be used for inter-layer prediction based on the information on the temporal sub-layer (S510).

The decoding device may determine that pictures corresponding to a temporal sub-layer equal to or larger than the maximum temporal sub-layer indicated by the maximum temporal sub-layer information is not used as a reference picture for inter-layer prediction of the current picture.

The decoding device may determine that pictures corresponding to a temporal sub-layer smaller than the maximum temporal sub-layer indicated by the maximum temporal sub-layer information may be used as a reference picture for inter-layer prediction of the current picture.

The decoding device may obtain a reference layer picture really available to decode the current picture for inter-layer prediction using the maximum temporal sub-layer information as described in table 12.

The decoding device performs inter-layer prediction of a current picture based on the reference picture (S520).

The decoding device may generate a reference picture list based on reference pictures which may be referred for the inter-layer prediction of the current picture. The decoding device may perform the inter-layer prediction of the current picture using the reference picture list.

The decoding device may perform inter-layer prediction with respect to a current picture to generate a prediction signal, and may add the prediction signal to a residual signal to obtain a reconstructed signal (reconstructed picture) of the current picture.

The computer-readable recoding medium includes a ROM, a RAM, a CD-ROM, a magnetic tape, a floptical Disk, an optical data storage device, and may be implemented in the form of a carrier wave (for example, transmission through Internet). The method according the present invention may be realized in the form of a program executed in a computer and stored in a computer-readable medium. The computer-readable recording medium includes a ROM, a RAM, a CD-ROM, a magnetic tape, a floppy disk, and an optical data storage device. Further, the computer-readable recording medium may be implemented in the form of a carrier wave (for example, transmission through Internet).

The computer-readable recording medium may be distributed in computer systems connected with each other through a network and a code which is readable by a computer in a distribution scheme may be stored and executed in the computer-readable recording medium. A functional program, a code and code segments for implementing the method may be easily deduced by programmers skilled in the related art.

Although the above embodiments has described the methods based on a flow chart as a series of steps or blocks, the present invention is not limited to an order of the steps, and certain steps may be performed in an order of the above steps or simultaneously. In addition, it should be understood that steps included in the flow chart include other steps without exclusion or at least one step of the flow chart may be omitted without affecting the spirit and scope of the present invention by a person having ordinary skill in the art to which the invention pertains.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The invention claimed is:

1. An inter-layer prediction method of an image including a plurality of layers, each layer having at least one sub-layer, the method comprising:
    decoding an indicator for a second layer indicating whether information on a maximum temporal identifier for a first layer which may be used for inter-layer prediction of the second layer is included in the bitstream;
    decoding the information on the maximum temporal identifier for the first layer, when the indicator for the second layer indicates the information on the maximum temporal identifier for the first layer is included in the bitstream;
    deriving a maximum temporal identifier for the first layer based on the information on the maximum temporal identifier for the first layer;
    deriving a reference picture from the first layer to be used for inter-layer prediction of a current picture of the second layer based on the maximum temporal identifier;
    performing the inter-layer prediction of the current picture based on the reference picture to generate a prediction block.

2. The inter-layer prediction method of claim 1, wherein the maximum temporal identifier for the first layer is derived based on an allowable maximum temporal level when the indicator indicates that the information on the maximum temporal identifier for the first layer is not included in the bitstream.

3. The inter-layer prediction method of claim 1, wherein the deriving of the reference picture to be used for inter-layer prediction of the current picture comprises determining that a picture of the first layer and having a temporal identifier greater than the maximum temporal identifier for the first layer is not used as a reference picture for the inter-layer prediction of the current picture.

4. The inter-layer prediction method of claim 1, wherein the deriving of the reference picture to be used for inter-layer prediction of the current picture comprises determining that a picture of the first layer and having a temporal identifier equal to or smaller than the maximum temporal identifier for the first layer is used as a reference picture for the inter-layer prediction of the current picture.

5. The inter-layer prediction method of claim 1, wherein at least one of the indicator and the information on the maximum temporal identifier is signaled through a Video Parameter Sets (VPS) extension syntax.

6. An inter-layer prediction method of an image including a plurality of layers, each layer having at least one sub-layer, the method comprising:
    determining a reference picture from a first layer to be used for inter-layer prediction of a current picture of a second layer;
    performing the inter-layer prediction of the current picture based on the reference picture to generate a prediction block;
    determining whether to encode a maximum temporal identifier for the first layer as information on a maximum temporal identifier included in a bitstream;
    encoding, based on the determination, an indicator for the first layer indicating whether the information on the maximum temporal identifier for the first layer is encoded and included in the bitstream;
    encoding the information on the maximum temporal identifier for the first layer when the maximum temporal identifier for the first layer is determined to be encoded for the first layer.

7. A computer readable recording medium for storing a bitstream, wherein the bitstream is generated by an inter-layer prediction method of an image including a plurality of layers, each layer having at least one sub-layer, the inter-layer prediction method comprising:
    determining a reference picture from a first layer to be used for inter-layer prediction of a current picture of a second layer;
    performing the inter-layer prediction of the current picture based on the reference picture to generate a prediction block;
    determining whether to encode a maximum temporal identifier for the first layer as information on a maximum temporal identifier included in a bitstream;
    encoding, based on the determination, an indicator for the first layer indicating whether the information on the maximum temporal identifier for the first layer is encoded and included in the bitstream;
    encoding the information on the maximum temporal identifier for the first layer when the maximum temporal identifier for the first layer is determined to be encoded for the first layer.

* * * * *